United States Patent
Zhang et al.

(10) Patent No.: US 9,020,044 B2
(45) Date of Patent: Apr. 28, 2015

(54) METHOD AND APPARATUS FOR WRITING VIDEO DATA IN RASTER ORDER AND READING VIDEO DATA IN MACROBLOCK ORDER

(75) Inventors: Lei Zhang, Richmond Hill (CA); Benedict C. Chien, Aurora (CA); Edward A. Harold, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 735 days.

(21) Appl. No.: 13/158,693

(22) Filed: Jun. 13, 2011

(65) Prior Publication Data

US 2012/0314758 A1 Dec. 13, 2012

(51) Int. Cl.
*H04N 19/433* (2014.01)
*H04N 19/423* (2014.01)
*H04N 19/426* (2014.01)
*G09G 5/00* (2006.01)
*H04N 19/186* (2014.01)
*H04N 19/61* (2014.01)

(52) U.S. Cl.
CPC ............ *G09G 5/006* (2013.01); *H04N 19/433* (2014.11); *H04N 19/426* (2014.11); *G09G 2340/02* (2013.01); *G09G 2370/16* (2013.01); *H04N 19/186* (2014.11); *H04N 19/423* (2014.11)

(58) Field of Classification Search
CPC .................. H04N 19/00515; H04N 19/00509; H04N 19/00484; H04N 19/00521; H04N 19/00496; H04N 19/426; H04N 19/427; H04N 19/43; H04N 19/436
See application file for complete search history.

(56) References Cited

U.S. PATENT DOCUMENTS

| | | | | |
|---|---|---|---|---|
| 5,099,447 A * | 3/1992 | Myszewski | .................... | 708/607 |
| 5,598,514 A * | 1/1997 | Purcell et al. | ................. | 345/418 |
| 5,608,656 A * | 3/1997 | Purcell et al. | ................. | 708/203 |
| 5,703,793 A * | 12/1997 | Wise et al. | ..................... | 382/232 |
| 5,724,537 A * | 3/1998 | Jones | ................................. | 711/1 |
| 5,774,676 A * | 6/1998 | Stearns et al. | ................ | 709/247 |
| 5,778,096 A * | 7/1998 | Stearns | ......................... | 382/233 |
| 5,809,270 A * | 9/1998 | Robbins | ........................ | 712/200 |
| 5,844,609 A * | 12/1998 | Filor et al. | ................ | 375/240.01 |
| 5,867,601 A * | 2/1999 | Phillips | .......................... | 382/250 |
| 5,870,497 A * | 2/1999 | Galbi et al. | .................... | 382/232 |
| 5,903,310 A * | 5/1999 | Finotello et al. | .......... | 375/240.25 |

(Continued)

OTHER PUBLICATIONS

D. Kim, J. Young, S. Milton, H.J. Kim, & Y. Kim, "A Real-Time MPEG Encoder Using a Programmable Processor", 40 IEEE Trans. on Consumer Electronics 161-170 (May 1994).*

(Continued)

*Primary Examiner* — Chikaodili E. Anyikire
*Assistant Examiner* — David N Werner
(74) *Attorney, Agent, or Firm* — Volpe and Koenig, P.C.

(57) ABSTRACT

A method and apparatus are described for processing video data. In one embodiment, a processor is provided with a video compression engine (VCE) that has a memory having a plurality of rows and a plurality of columns of addresses. Video data, (luma data or chroma data), is written in row (i.e., raster) order into the addresses of the memory, and then the data is read out of the addresses in column order. Data is written into the addresses of the columns of the memory as they are read out, which is subsequently read out in row order. This process of switching back and forth between reading and writing data in row and column order continues as the data is read and processed by an encoder to generate a compressed video stream.

15 Claims, 9 Drawing Sheets

(56) References Cited

U.S. PATENT DOCUMENTS

| | | | |
|---|---|---|---|
| 6,961,474 B1* | 11/2005 | Hirano et al. | 382/246 |
| 7,072,395 B2* | 7/2006 | Hwang et al. | 375/240.12 |
| 7,920,624 B2* | 4/2011 | Hsiun et al. | 375/240.03 |
| 2006/0222080 A1* | 10/2006 | Wang | 375/240.24 |
| 2008/0040411 A1* | 2/2008 | Stojancic et al. | 708/290 |
| 2008/0285652 A1* | 11/2008 | Oxman et al. | 375/240.16 |
| 2009/0074072 A1* | 3/2009 | Endo | 375/240.16 |

OTHER PUBLICATIONS

G.H. Golub & C.F. van Loan, Matrix Computations, 3d Ed. 1996 at 45-47.*

J.M. M Ortega & R.G. Voigt, "Solution of Partial Differential Equations on Vector and Parallel Computers", 27 SIAM Review 149-240 (Jun. 1985).*

J.J. Dongarra, F.G. Gustayson & A. Karp, "Implementing Linear Algebra Algorithms for Dense Matrices on a Vector Pipeline Machine", 26 SIAM Review 91-112 (Jan. 1984).*

D. Chen, "Hierarchical Blocking and data flow analysis for numerical linear algebra", Proc. of the 1990 ACM/IEEE Conf. on Supercomputing 12-19 (Oct. 1990).*

ITU-T Recommendation H.261 (Mar. 1993).*

Advanced Micro Devices, "BIOS and Kernel Developer's Guide (BKDG) for AMD Family 10h Processors," 31116 Rev 3.06, p. 136 (Mar. 26, 2008).

* cited by examiner

METHOD AND APPARATUS FOR WRITING VIDEO DATA IN RASTER ORDER AND READING VIDEO DATA IN MACROBLOCK ORDER

FIELD OF INVENTION

The present invention is generally directed to the buffering and reorganizing of video data.

BACKGROUND

Processors, such as graphics processing units (GPUs), have been developed to assist in the expedient display of computer generated images and video. Typically, a two-dimensional (2D) and/or three-dimensional (3D) engine associated with a processor may render images and video as data (i.e., pixel data) that are stored in frame buffers of system memory, typically in an RGB (red/green/blue) format. A display controller in the processor may be used to retrieve the image/video frame data and process the data in a selected manner to provide a desired type of video signal output. Where applicable, the display controller may also retrieve and process related audio and cursor control data in connection with the image/video frame data.

A pixel is generally thought of as the smallest single component of a digital image. The more pixels used to represent an image, the closer the result can resemble the original. The number of pixels in an image is sometimes referred to as the resolution. Pixel counts may be expressed as a single number, as in a "three-megapixel" digital camera that nominally has three million pixels. Pixel counts may also be expressed as a pair of numbers, such as in a 640×480 display, which has 640 pixels from side-to-side and 480 pixels from top-to-bottom, and therefore has a total number of 640×480=307,200 pixels or approximately 0.3 megapixels.

YUV is a standard color encoding system used for analog television (TV) worldwide. The YUV color space (color model) differs from RGB formats that typical cameras capture. The "Y" in YUV stands for "luma," which is brightness, or lightness; the "U" and "V" stand for "chrominance" or color. Black and white TVs decode only the Y part of a YUV signal.

Chrominance, (i.e., chroma), is the signal used in video systems to convey the color information of the picture, separately from the accompanying luma (Y) signal. Chroma is usually represented as two color-difference components: U=B'−Y' (blue−luma) and V=R'−Y' (red−luma). Each of these difference components may have scale factors and offsets applied to it, as specified by the applicable video standard. The "U" and "V" provide color information and are "color difference" signals of blue minus luma (B−Y) and red minus luma (R−Y). Through a process called "color space conversion," a video camera may be configured to convert RGB data captured by its sensors into either composite analog signals (YUV) or component versions (analog YPbPr or digital YCbCr). For rendering on screen, these color spaces are typically converted back to RGB by the TV or other display.

A macroblock (MB) is a unit of pixels typically used in image compression. The sizes of MBs are expressed as actual image sizes, typically in the notation W×H, denoting width and height. Color information is usually encoded at a lower resolution than the luminance information. For example, in 4:2:0 subsampled YUV, U and V components are each subsampled at a factor of 2 horizontally and vertically. When encoding such content, a luma MB may be proportionally larger than a chroma MB.

Typically, a processor will have multiple types of standard display outputs. Current standard types of outputs include digital-to-analog converter (DAC) outputs used to drive many commercially available types of cathode ray tube (CRT) monitors/panels/projectors via an analog video graphics array (VGA) cable, digital visual interface (DVI) outputs used to provide very high visual quality on many commercially available digital display devices, such as flat panel displays, and high-definition multimedia interface (HDMI) outputs used as a compact audio/video interface for uncompressed digital data for many high-definition televisions and the like. A display controller that has multiple modes may support standard conventional functions of cursor compositing, image rescaling, color space conversion, gamma control and the like for wired display interfaces.

Additionally, processors may have multiple, (e.g., two, four or six), display controllers in order to concurrently drive multiple display outputs to concurrently display the same and/or different images or video on different display devices. Typically, the display controllers are associated with the processor's outputs in a multiplexed configuration such that any one of the display controllers can be directed to drive any of the processor's outputs.

Although many devices have built in displays or direct cable connections for display devices, there are expanding applications for sending display outputs from video or graphics sources to remote locations over wired or wireless networks. In lieu of transmitting standard uncompressed display data, network bandwidth constraints have led to data compression transmission requirements that are required to be applied to a display data stream for remote display.

A variety of devices have been developed to convert the various types of standard graphic outputs for sending display outputs from video or graphics sources to remote locations over wired or wireless networks. A wireless or wired display typically involves video data compression, which is usually MB-based, (e.g., 16×16 pixels), while the video data is raster-based, (e.g., 1 line at a time). An entire MB row, (e.g., 16 lines), may have to be buffered before the first MB compression may take place. As used herein, video data includes data of individual images.

Typically, double buffering of video data, (e.g., 32-lines), is implemented so that while the video compression engine is operating one 16-line MB row, the other 16-line MB row is buffered. Thus, for example, 32 total lines of memory may be used, separated into two partitions of sixteen (16) lines.

The implementation of double buffering is expensive and can quickly exhausts memory capacity. For example, 32 lines of 1920 pixels of video data, where each pixel is 3 bytes, require over 180 kilobytes of memory. By using a 16-line MB buffering scheme, a 50% reduction in video data memory usage would result.

SUMMARY OF EMBODIMENTS

A method and apparatus are described for processing video data. In one embodiment, a processor is provided with a video compression engine (VCE) that has a memory having a plurality of rows and a plurality of columns of addresses. Video data, (luma data or chroma data), is written in row (i.e., raster) order into the addresses of the memory, and then the data is read out of the addresses in column order. Data is written into the addresses of the columns of the memory as they are read out, which is subsequently read out in row order. This process of switching back and forth between reading and writing data in row and column order continues as the data is read and processed by an encoder to generate a compressed video stream.

Each of the addresses may hold data representing eight (8) pixels. The video data may include an uncompressed video stream of YUV or RGB 4:4:4 samples. The processor may transmit the compressed video stream to a display device. The display device displays the video data upon receiving the compressed video stream.

In another embodiment, a computer-readable storage medium stores a set of instructions for execution by one or more processors to facilitate manufacture of a semiconductor device that includes the VCE described above. The instructions may be Verilog data instructions or hardware description language (HDL) instructions.

BRIEF DESCRIPTION OF THE DRAWINGS

A more detailed understanding may be had from the following description, given by way of example in conjunction with the accompanying drawings wherein.

DETAILED DESCRIPTION OF EMBODIMENTS

Figure 1:
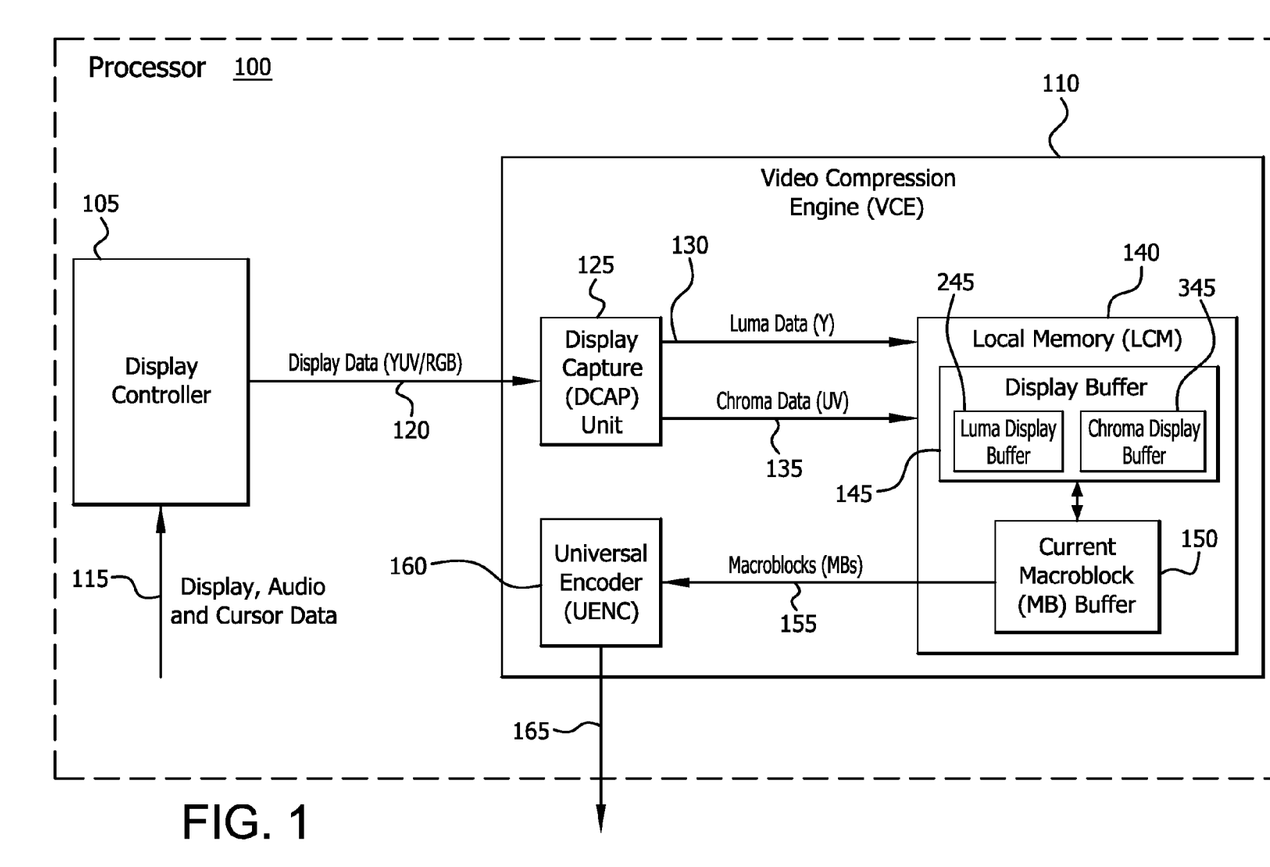
FIG. 1 is a block diagram of an example of a processor that is configured in accordance with the present invention.

FIG. 1 shows an example of a processor 100 that is configured in accordance with the present invention. The processor 100 includes a display controller 105 and a video compression engine (VCE) 110. The processor 100 preferably has multiple display controllers in order to concurrently drive multiple display outputs to concurrently display the same and/or different images or video on different display devices. Preferably, the processor 100 has two, four or six display controllers, although only one is shown for convenience. Typically, the display controllers are associated with multiple processor outputs (not shown), such as a DAC, DVI and HDMI output components, in a multiplexed configuration such that any one of the display controllers can be directed to drive any of the output components of the processor 100 via appropriate set-up instructions.

In the example illustrated in FIG. 1, the display controller 105 is illustrated as configured to read display, audio and cursor data 115 and to send display data 120 including an uncompressed video stream of YUV or RGB 4:4:4 video samples to the VCE 110. The uncompressed video stream of the display data 120 is typically controlled by a multiplex device (not shown). When the display controller 105 is configured to read display, audio and cursor data 115 and to send appropriately processed display data to a standard type of processor output component, such as a DAC, DVI or HDMI output components, the multiplex device will direct the display data 120 output from the display controller 105 to the appropriate output component instead of to the VCE 110. When another display controller of the processor 100 is configured to read display, audio and cursor data and to send display data including an uncompressed video stream of YUV or RGB 4:4:4 samples to the VCE 110, the multiplex device will direct the signal output from that other display controller to the VCE 110.

The example VCE 110 includes a display capture (DCAP) unit 125 that is configured to receive and process the display data 120, and output luma data 130 and chroma data 135, which is input to a local memory (LCM) 140 that includes a display buffer 145 and a current MB buffer 150. Optionally, the DCAP unit 125 may be configured to down sample the YUV/RGB video stream of the display data 120 from 4:4:4 to 4:2:0. The luma data 130 and the chroma data 135 may be temporarily stored in the display buffer 145 until the data 130 and 135 is ready to be transferred to the current MB buffer 150, which is configured to output MBs 155 after the data 130 and 135 is buffered and reorganized from raster to MB order.

In the example VCE 110, a universal encoder (UENC) 160 is configured to receive the MBs 155 and generate a compressed video stream 165. The display buffer 145 may include a luma display buffer 245 and a chroma display buffer 345.

The display buffer 145 is preferably implemented as a circular buffer, where data read out is subsequently replaced by data that is written in to minimize the size of the display buffer 145. For VCE encoding in the example VCE 110, the data 130 and 135 is converted from raster scan order to MB order before processing. This is performed through the use of a plurality of LCM buffers, with one buffer being dedicated to storing current frame data.

To maximize the efficiency of the LCM 140, internal buffers may be used to support a predetermined number of bit transactions. One set of buffers may handle writes to the LCM 140, and the other may handle transfers from the display buffer 145 to the current MB buffer 150 (read then write). As an example, a "ping-pong" buffering scheme may be used when initially writing the data 130 and 135 to the LCM 140, whereby two 256-bit display buffers may be used. In this example, while the data in one of the display buffers is being written to the LCM 140, the other display buffer may be used to store new samples, and vice versa.

In the example VCE 110, the DCAP unit 125 and the UENC 160 may be configured to write to and read from the LCM 140. A single LCM client may be used to interface with the DCAP unit 125. Since the data 130 and 135 is in raster scan order, whereas the VCE 110 reads in MB order, it is desirable to efficiently organize the data 130 and 135 to facilitate data re-ordering. The current buffer size for luma and chroma data may be sized as desired.

Figure 2A:
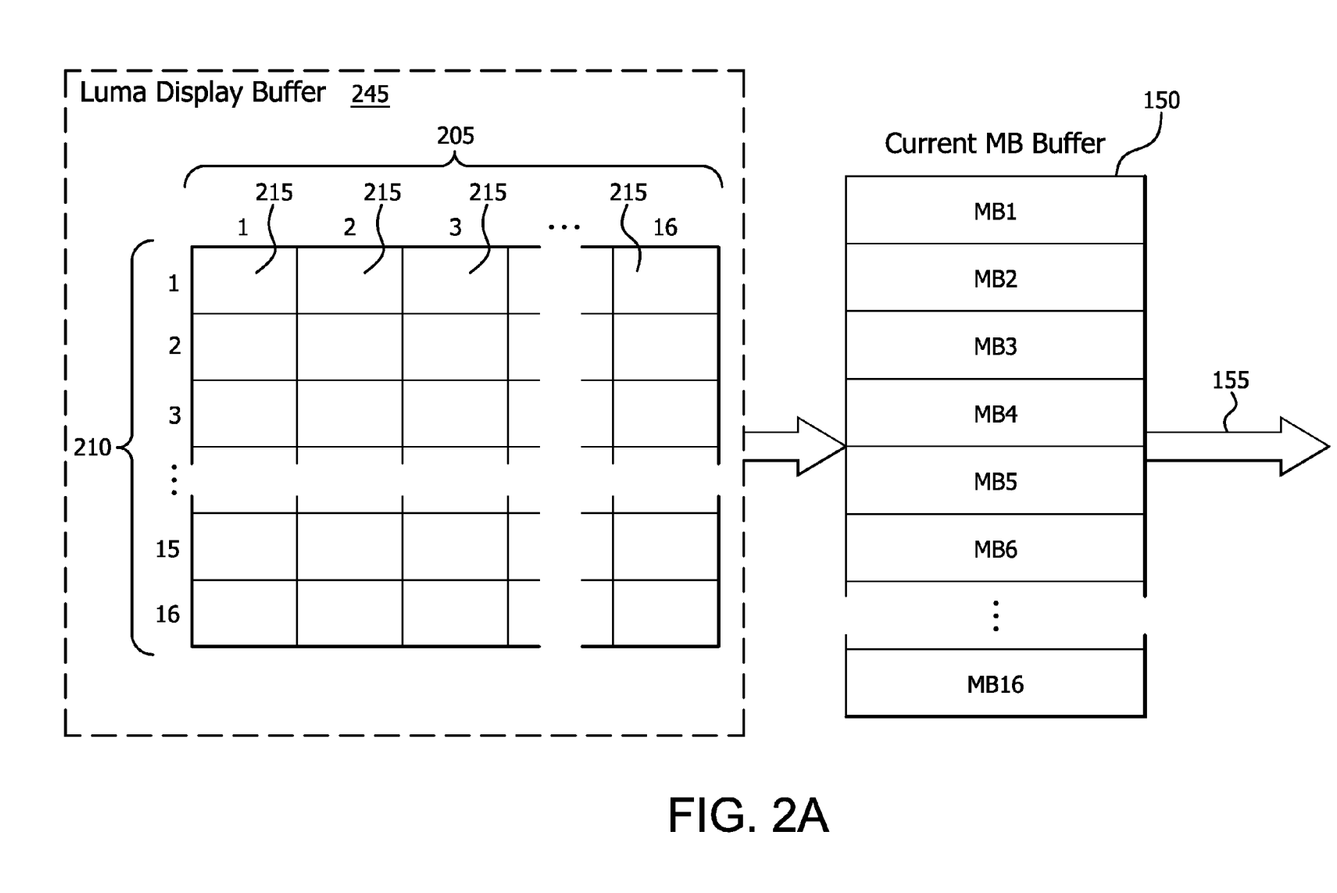
FIG. 2A is an illustration of an example configuration of a luma display buffer and a current MB buffer that may be used in the processor of FIG. 1 before luma data is written into the luma display buffer in accordance with one embodiment of the present invention.

FIG. 2A shows an example configuration of the luma display buffer 245 and the current MB buffer 150 that may be used in the processor 100 of FIG. 1 before luma data 130 is written into the display buffer 145. In this example, luma storage is implemented by using the luma display buffer 245 as temporary storage until data is ready to be transferred to the current MB buffer 150. The luma display buffer 245 is implemented as a circular buffer, where data that is read out is subsequently replaced by data that is written in, so as to minimize the size of the luma display buffer 245. In order to use a circular buffer approach and re-order data from raster scan to MB, the luma display buffer 245 is configured into a matrix having sixteen (16) columns 205 and sixteen (16) rows 210, each having sixteen (16) addresses 215, that are each configured to hold data representing eight (8) pixels, (e.g., 1-8, 9-16, . . . , 121-128). Thus, each column 205 is configured to hold data representing 8×16 pixels, and each row may be configured to hold data representing 8×16 pixels. The current MB buffer 150 is configured to hold 16 MBs, (i.e., MB1-MB16).

When data is first written to the empty luma display buffer 245, the data is written in raster order. Consumption by the VCE 110 may occur in MB order. Thus, the luma display buffer 245 may be read out as columns, (e.g., column 1=MB1, column 2=MB2, . . . , column 16=MB16). To implement this circular buffer scheme, data is subsequently written into the luma display buffer 245 in column order to reclaim the unused space. Data is written into the columns in a way that allow MBs to be read out as rows. In all cases, the MBs are read either as rows or columns. The orientation of the luma display buffer 245 is "flipped" every sixteen (16) lines of luma data.

The luma display buffer 245 in this example is 128×16 in size, but may be partitioned as a 2-dimensional (2D) memory with sixteen (16) rows and sixteen (16) columns. Addresses (x, y) may fall in the range ([1,16],[1,16]). Each address may hold data representing eight (8) pixels.

Figure 2B:
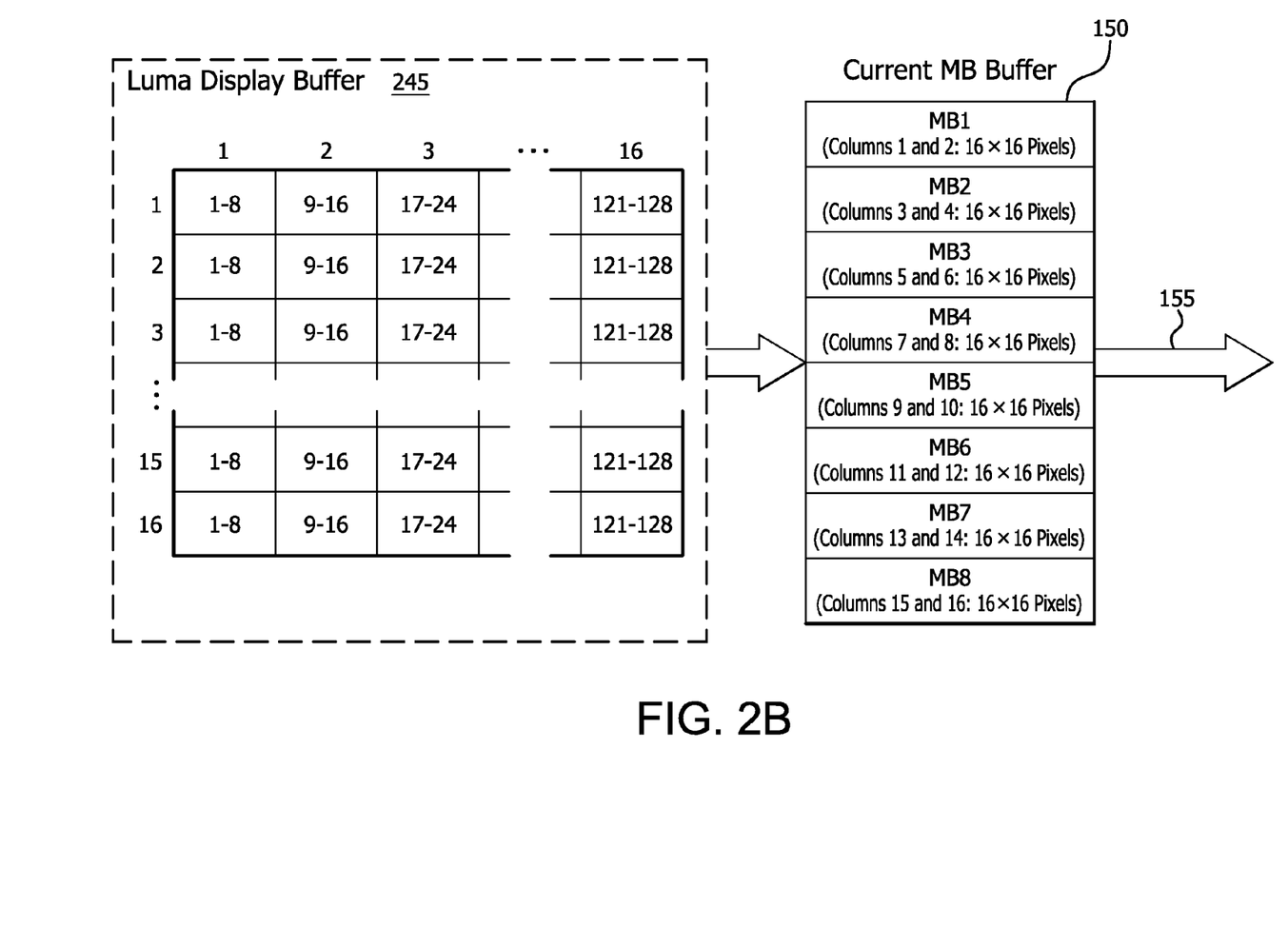
FIG. 2B is an illustration of the luma display buffer and the current MB buffer of FIG. 2A after luma data is written into addresses of the luma display buffer in row (i.e., raster) order, and the luma data is read out in column order, two columns at a time, to respective MBs of the current MB buffer.
Figure 2C:
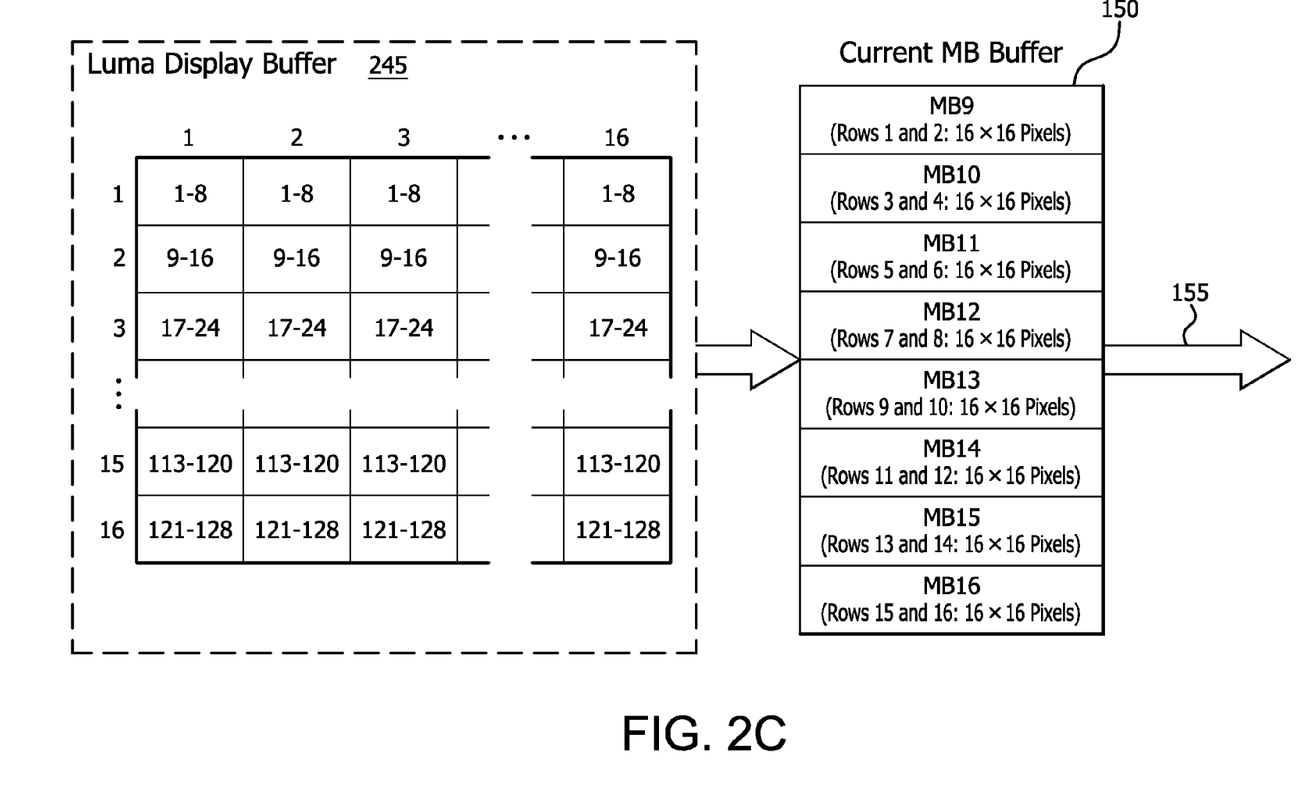
FIG. 2C is an illustration of the luma display buffer and the current MB buffer of FIG. 2A after luma data is written in column order into the addresses of the luma display buffer as they are read out, and the luma data is read out in row order, two rows at a time, to respective MBs of the current MB buffer.

In a preferred embodiment as shown in FIGS. 2B and 2C, the luma display buffer 245 may be read out at a rate of two columns or two rows per MB, whereby each MB contains 16×16 pixels.

FIG. 2B shows the luma display buffer 245 and the current MB buffer 150 of FIG. 2A after luma data is written into the addresses 215 of the luma display buffer 245 in row (i.e., raster) order, and the luma data is read out in column order to respective MBs of the current MB buffer 150.

FIG. 2C shows the luma display buffer 245 and the current MB buffer 150 of FIG. 2A after luma data is written in column order into the addresses 215 of the luma display buffer 245 as they are read out, and the luma data is read out in row order to respective MBs of the current MB buffer 150.

When data is written to the luma display buffer 245 in column order, the rows are read out as MBs. The buffer scheme of the present invention may be used for any frame size in both the horizontal and vertical directions. For example, this is consistent with H.264 standard where luma MB sizes are 16×16. Thus, the VCE 110 may need to buffer 16 lines of luma data before it may perform compressions.

Figure 3A:
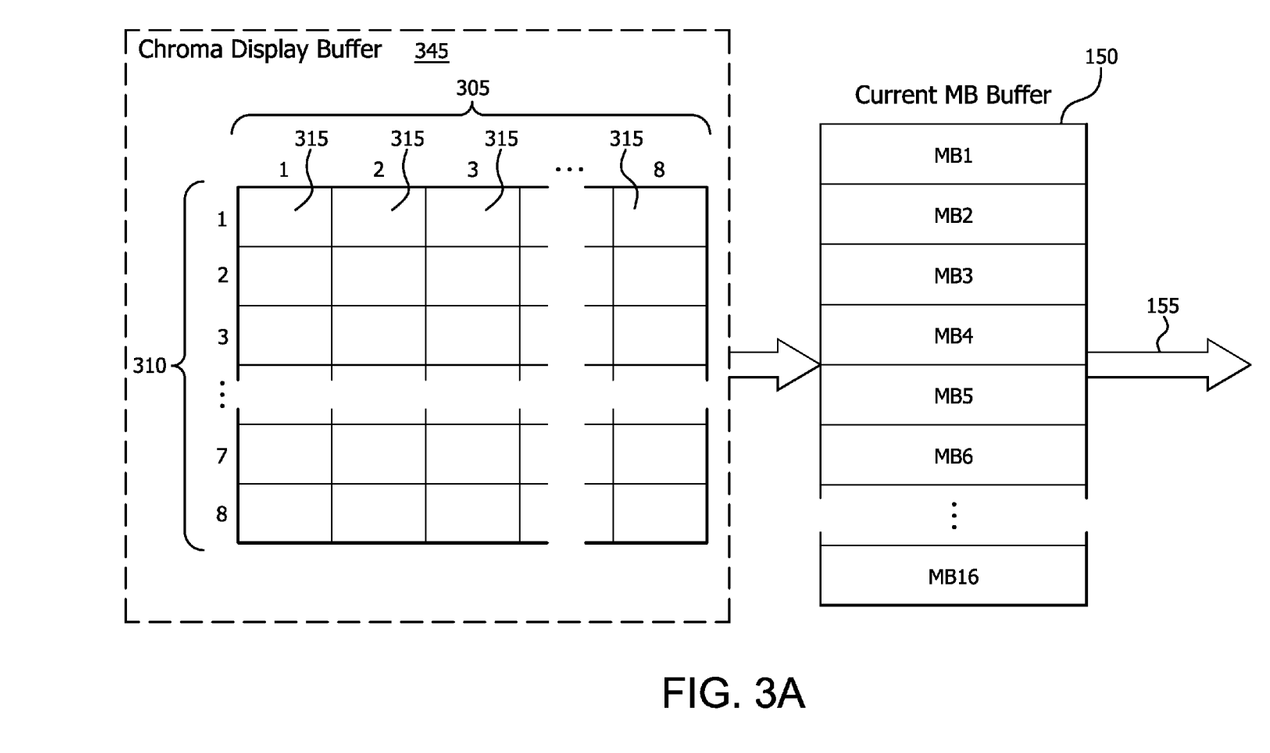
FIG. 3A is an illustration of an example configuration of a chroma display buffer and a current MB buffer used in the processor of FIG. 1 before chroma data is written into the chroma display buffer in accordance with another embodiment of the present invention.

In another embodiment of the present invention, FIG. 3A shows an example configuration of the chroma display buffer 345 and the current MB buffer 150 that may be used in the processor 100 of FIG. 1 before chroma data 135 is written into the chroma display buffer 345. Chroma storage is preferably implemented by using the chroma display buffer 345 as temporary storage until data is ready to be transferred to the current MB buffer 150. The chroma display buffer 345 may be implemented as a circular buffer, where data that is read out is subsequently replaced by data that is written in to minimize the size of the chroma display buffer 345. In order to use a circular buffer approach and re-order data from raster scan to MB, the chroma display buffer 345 is configured into a matrix having eight (8) columns 305 and eight (8) rows 310, each having eight (8) addresses 315, that are each configured to hold data representing eight (8) pixels, (e.g., 1-8, 9-16, . . . , 57-64). Thus, each column 305 is configured to hold data representing 8×8 pixels, and each row is configured to hold data representing 8×8 pixels. The current MB buffer 150 may be configured to hold sixteen (16) MBs, (i.e., MB1-MB16).

When data is first written to the empty chroma display buffer 345, the data is written in raster order. Consumption by the VCE 110 may occur in MB order. Thus, the chroma display buffer 345 may be read out as columns, (i.e., column 1=MB1, column 2=MB2, . . . , column 8=MB8). To implement this circular buffer scheme, data is subsequently written into the chroma display buffer 345 in column order to reclaim the unused space. Data is written into the columns in a way that allow MBs to be read out as rows. In all cases, the MBs are read either as rows or columns. The orientation of the chroma display buffer 345 may be "flipped" every eight (8) lines of chroma data.

The chroma display buffer 345 in this example is 64×8 in size, but may be partitioned as a 2-dimensional (2D) memory with eight (8) rows and eight (8) columns. Addresses (x, y) may fall in the range ([1,8],[1,8]). Each address may hold data representing eight (8) pixels.

Figure 3B:
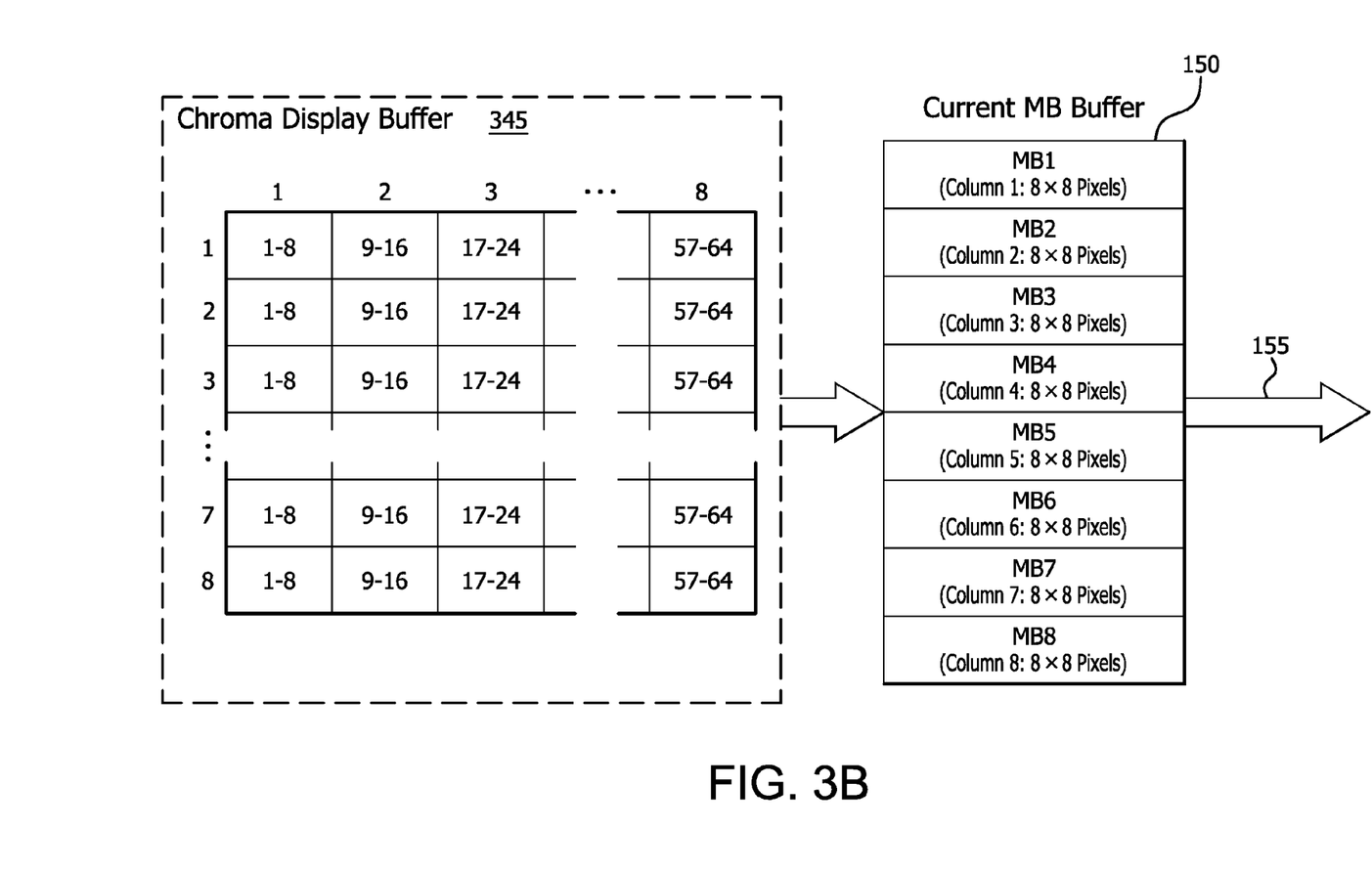
FIG. 3B is an illustration of the chroma display buffer and the current MB buffer of FIG. 3A after chroma data is written into addresses of the chroma display buffer in row (i.e., raster) order, and the chroma data is read out in column order to respective MBs of the current MB buffer.

FIG. 3B shows the chroma display buffer 345 and the current MB buffer 150 of FIG. 3A after chroma data is written into addresses 315 of the chroma display buffer 345 in row (i.e., raster) order, and the chroma data is read out in column order to respective MBs of the current MB buffer 150.

Figure 3C:
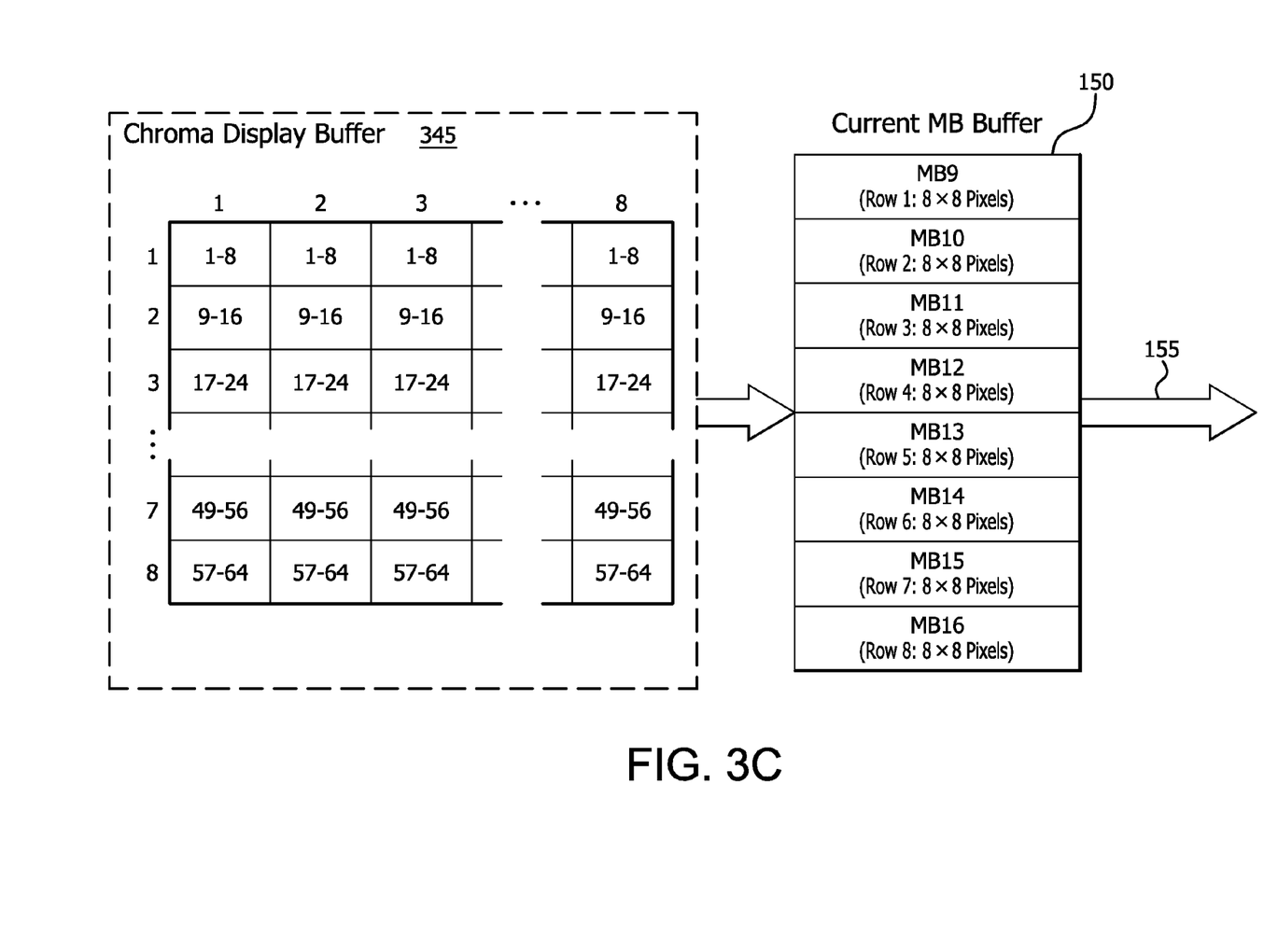
FIG. 3C is an illustration of the chroma display buffer and the current MB buffer of FIG. 3A after chroma data is written in column order into the addresses of the chroma display buffer as they are read out, and the chroma data is read out in row order to respective MBs of the current MB buffer.

FIG. 3C shows the chroma display buffer 345 and the current MB buffer 150 of FIG. 3A after chroma data is written in column order into the addresses 315 of the chroma display buffer 345 as they are read out, and the chroma data is read out in row order to respective MBs of the current MB buffer 150.

When data is written to the chroma display buffer 345 in column order, the rows are read out as MBs. The buffer scheme of the present invention may be used for any frame size in both the horizontal and vertical directions. For example, this is consistent with H.264 standard where chroma MB sizes are 8×8. It is necessary for the VCE 110 to buffer eight (8) lines of chroma data before the UENC 160 may perform compressions.

Figure 4:
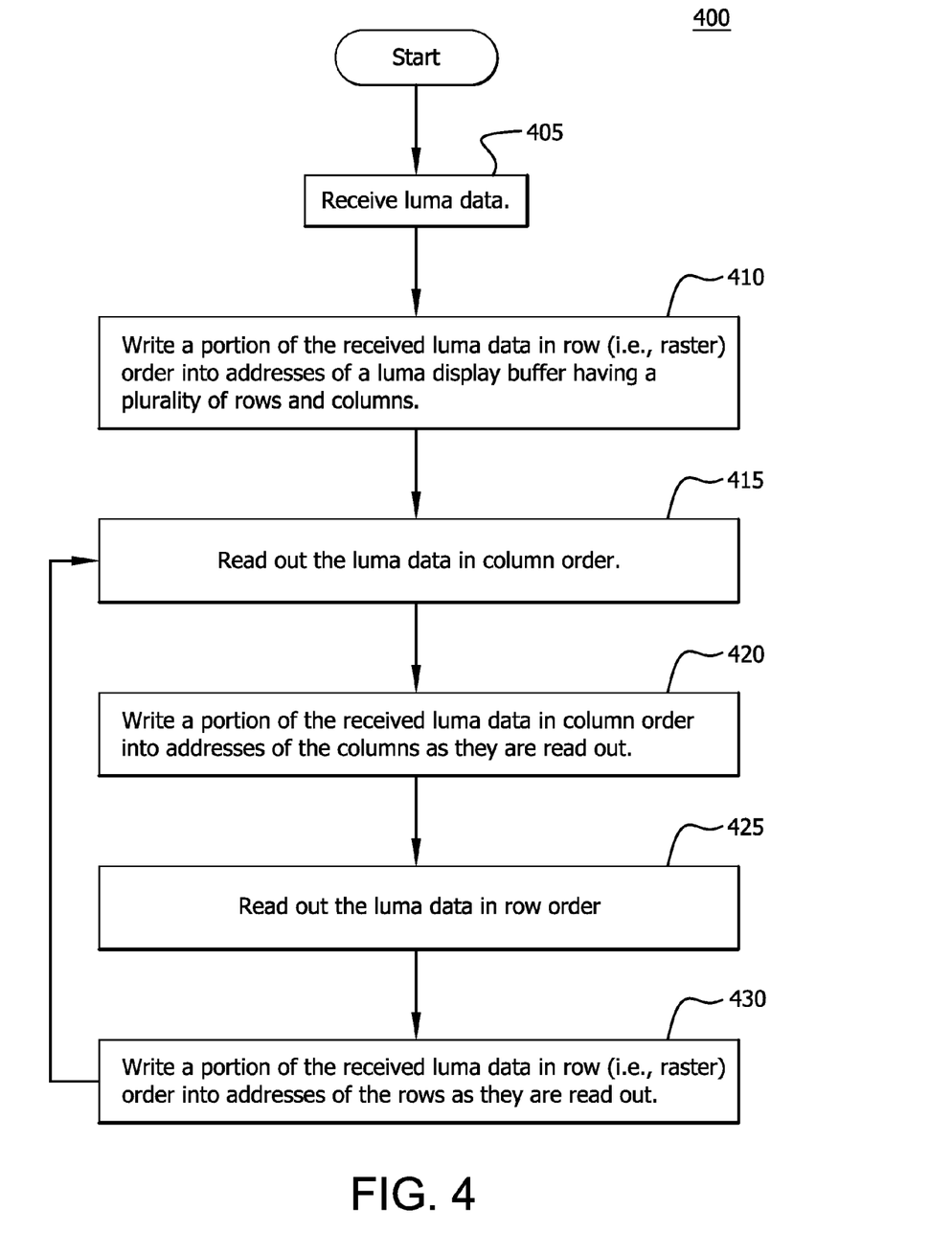
FIG. 4 is a flow diagram of a procedure of processing luma data in the display buffer and the current MB buffer of the VCE of FIG. 1.

FIG. 4 is a flow diagram of a procedure 400 of processing luma data in the VCE 110 of FIG. 1. Referring to FIGS. 1 and 4, in step 405, the luma display buffer 245 receives luma data 130. In step 410, a portion of the received luma data is written in row (i.e., raster) order into addresses of the luma display buffer 245 having a plurality of rows and columns. The number of rows and columns may be equal. In step 415, luma data in the addresses of the luma display buffer 245 is read out in column order. Optionally, the luma data may be read out to respective MBs of the current MB buffer 150. In step 420, a portion of the received luma data is written in column order into addresses of the columns as they are read out. In step 425, luma data is read out in row order. Optionally, the luma data may be read out to respective MBs of the current MB buffer 150. In step 430, a portion of the received luma data is written in row (i.e., raster) order into addresses of the rows as they are read out, and then the procedure 400 returns to step 415. A compressed video stream or TS 165 is generated based on the read out video data.

Figure 5:
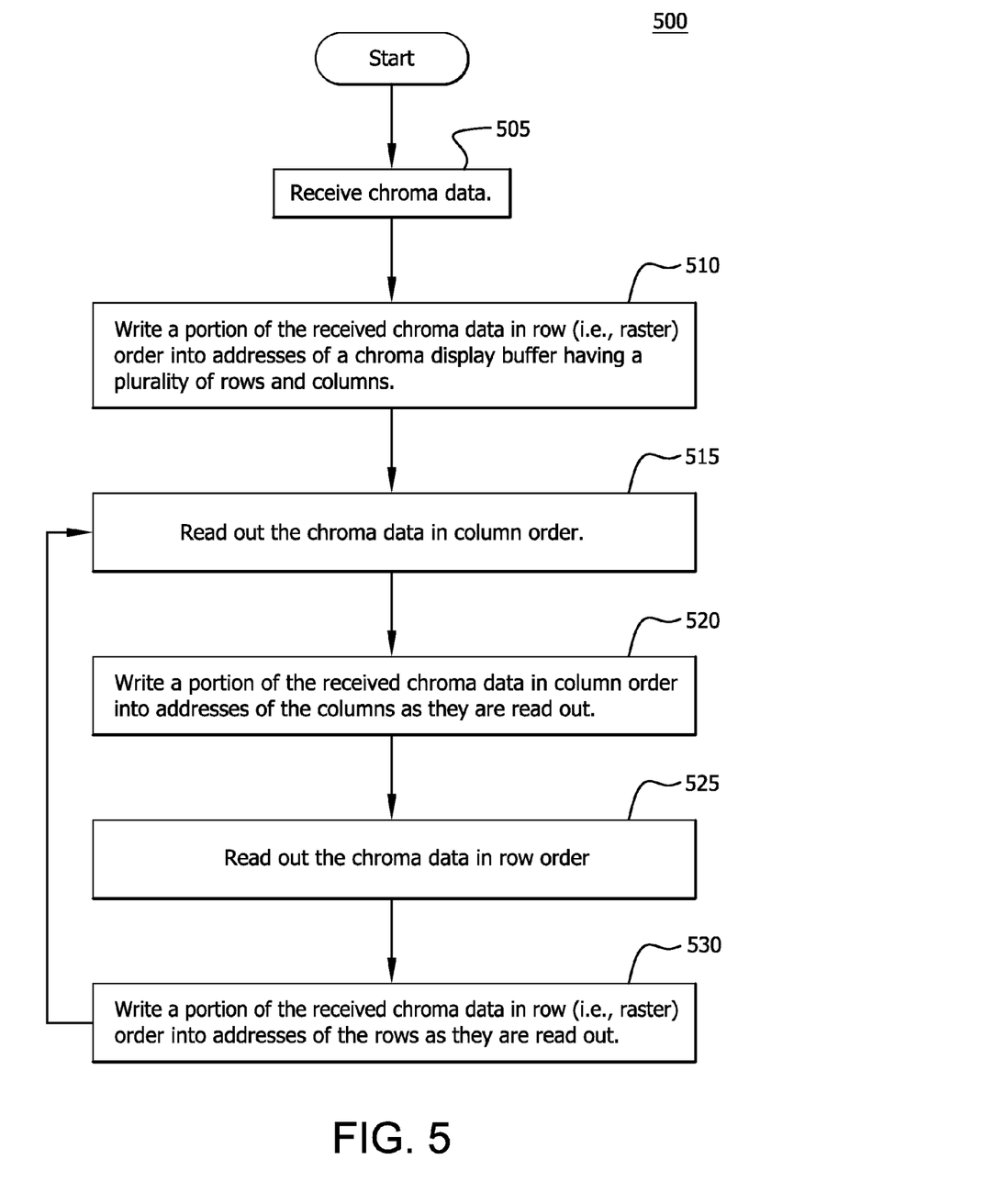
FIG. 5 is a flow diagram of a procedure of processing chroma data in the display buffer and the current MB buffer of the VCE of FIG. 1.

FIG. 5 is a flow diagram of a procedure 500 processing chroma data in the VCE 110 of FIG. 1. Referring to FIGS. 1 and 5, in step 505, the chroma display buffer 345 receives chroma data 135. In step 510, a portion of the received chroma data is written in row (i.e., raster) order into addresses of the chroma display buffer 345 having a plurality of rows and columns. The number of rows and columns may be equal. In step 515, chroma data in the addresses of the chroma display buffer 345 is read out in column order. Optionally, the chroma data may be read out to respective MBs of the current MB buffer 150. In step 520, a portion of the received chroma data is written in column order into addresses of the columns as they are read out. In step 525, chroma data is read out in row order. Optionally, the chroma data may be read out to respective MBs of the current MB buffer 150. In step 530, a portion of the chroma data is written in row (i.e., raster) order into addresses of the rows as they are read out, and then the procedure 500 returns to step 515. A compressed video stream or TS 165 is generated based on the read out video data.

Although features and elements are described above in particular combinations, each feature or element can be used alone without the other features and elements or in various combinations with or without other features and elements. The apparatus described herein may be manufactured by using a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

As a result of embodying aspects of the invention in certain embodiments, devices may be created which result in smaller memory footprints during operation, lower costs (due to reduced memory footprints) and the like. Other improvements may be present in different embodiments.

Embodiments of the present invention may be represented as instructions and data stored in a computer-readable storage medium. For example, aspects of the present invention may be implemented using Verilog, which is a hardware description language (HDL). When processed, Verilog data instructions may generate other intermediary data, (e.g., netlists, GDS data, or the like), that may be used to perform a manufacturing process implemented in a semiconductor fabrication facility. The manufacturing process may be adapted to manufacture semiconductor devices (e.g., processors) that embody various aspects of the present invention.

Suitable processors include, by way of example, a general purpose processor, a special purpose processor, a conventional processor, a digital signal processor (DSP), a plurality of microprocessors, a graphics processing unit (GPU), a DSP core, a controller, a microcontroller, application specific integrated circuits (ASICs), field programmable gate arrays (FPGAs), any other type of integrated circuit (IC), and/or a state machine, or combinations thereof.

What is claimed is:

1. A method, implemented in a processor, of processing video data, the method comprising:
    a) writing a portion of the video data in raster order by rows into addresses of a memory having a plurality of rows and a plurality of columns;
    b) reading out video data in the addresses of the memory in macroblock (MB) order by columns;
    c) writing a portion of the video data in raster order into the addresses of the columns of the memory as the MB data is read out in column order;
    d) reading out video data in the addresses of the memory in MB order by rows;
    e) writing a portion of the video data in raster order into the addresses of the rows of the memory as the MB data is read out in row order; and
    f) generating a compressed video stream based on the video data read out in MB order by columns and rows.

2. The method of claim 1 wherein each of the addresses holds data representing eight (8) pixels.

3. The method of claim 1 wherein the video data is at least one of luma data and chroma data.

4. The method of claim 1 wherein the video data includes an uncompressed video stream of YUV or RGB 4:4:4 samples.

5. The method of claim 1 further comprising:
    g) transmitting the compressed video stream to a display device.

6. The method of claim 5 further comprising:
    h) the display device receiving the compressed video stream; and
    i) the display device displaying the video data.

7. A processor for processing video data, the processor comprising:
    a video compression engine (VCE) configured to:
        write a portion of the video data in raster order by rows into addresses of a memory having a plurality of rows and a plurality of columns,
        read out video data in the addresses of the memory in macroblock (MB) order by columns,
        write a portion of the video data in raster order into the addresses of the columns of the memory as the MB data is read out in column order,
        read out video data in the addresses of the memory in MB order by rows,
        write a portion of the video data in raster order into the addresses of the rows of the memory as the MB data is read out in row order, and
        generate a compressed video stream based on the video data read out in MB order by columns and rows.

8. The processor of claim 7 wherein each of the addresses holds data representing eight (8) pixels.

9. The processor of claim 7 where the video data is at least one of luma data and chroma data.

10. The processor of claim 7 wherein the video data includes an uncompressed video stream of YUV or RGB 4:4:4 samples.

11. The processor of claim 7 wherein the compressed video stream is transmitted to a display device.

12. The processor of claim 11 wherein the display device receives the compressed video stream and displays the video data.

13. A non-transitory computer-readable storage medium storing a set of instructions for execution by one or more processors to facilitate manufacture of a semiconductor device that includes:
- a video compression engine (VCE) configured to:
    - write a portion of the video data in raster order by rows into addresses of a memory having a plurality of rows and a plurality of columns,
    - read out video data in the addresses of the memory in macroblock (MB) order by columns,
    - write a portion of the video data in raster order into the addresses of the columns of the memory as the MB data is read out in column order,
    - read out video data in the addresses of the memory in MB order by rows,
    - write a portion of the video data in raster order into the addresses of the rows of the memory as the MB data is read out in row order, and
    - generate a compressed video stream based on the video data read out in MB order by columns and rows.

14. The non-transitory computer-readable storage medium of claim 13 wherein the instructions are Verilog data instructions.

15. The non-transitory computer-readable storage medium of claim 13 wherein the instructions are hardware description language (HDL) instructions.

* * * * *